US011050120B2

(12) United States Patent
Tanaka

(10) Patent No.: US 11,050,120 B2
(45) Date of Patent: Jun. 29, 2021

(54) ENERGY STORAGE DEVICE

(71) Applicant: GS Yuasa International Ltd., Kyoto (JP)

(72) Inventor: Kie Tanaka, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 0 days.

(21) Appl. No.: 15/767,069

(22) PCT Filed: Oct. 6, 2016

(86) PCT No.: PCT/JP2016/004510
§ 371 (c)(1),
(2) Date: Apr. 9, 2018

(87) PCT Pub. No.: WO2017/061123
PCT Pub. Date: Apr. 13, 2017

(65) Prior Publication Data
US 2018/0301684 A1 Oct. 18, 2018

(30) Foreign Application Priority Data
Oct. 9, 2015 (JP) .............................. JP2015-200833

(51) Int. Cl.
*H01M 50/449* (2021.01)
*H01M 4/70* (2006.01)
(Continued)

(52) U.S. Cl.
CPC .......... *H01M 50/449* (2021.01); *H01G 11/52* (2013.01); *H01M 4/02* (2013.01);
(Continued)

(58) Field of Classification Search
None
See application file for complete search history.

(56) References Cited

U.S. PATENT DOCUMENTS

2009/0004570 A1   1/2009   Inoue
2009/0098446 A1   4/2009   Okada et al.
(Continued)

FOREIGN PATENT DOCUMENTS

CN   104011899 A    8/2014
JP   2005-190913 A  7/2005
(Continued)

OTHER PUBLICATIONS

International Search Report (ISR) PCT Form PCT/ISA/210), in PCT/JP2016/004510, dated Dec. 27, 2016.
(Continued)

*Primary Examiner* — Tracy M Dove
(74) *Attorney, Agent, or Firm* — McGinn I.P. Law Group, PLLC.

(57) ABSTRACT

An energy storage device includes: a negative electrode having a negative composite layer on a negative electrode collector foil and a negative composite layer non-forming part along a side of a negative electrode collector foil; a positive electrode including a positive composite layer on a positive electrode collector foil and a positive composite layer non-forming part along a side of the positive electrode collector foil; and a separator including an insulating layer on its surface opposing the positive electrode. An end S1 on a side of the negative electrode current collector of the separator is projected more than an end P1 on the side of the negative electrode current collector of the positive composite layer, an end S2 on a side of the positive electrode current collector of the separator is projected more than an end P2 on the side of the positive electrode current collector of the positive composite layer, and a distance W2 from the end P2 to the end S2 is smaller than a distance W1 from the end P1 to the end S1.

19 Claims, 5 Drawing Sheets

(51) Int. Cl.
*H01M 10/04* (2006.01)
*H01M 4/13* (2010.01)
*H01G 11/52* (2013.01)
*H01M 4/02* (2006.01)
*H01M 10/05* (2010.01)
*H01M 10/058* (2010.01)
*H01M 4/04* (2006.01)
*H01M 50/409* (2021.01)
*H01M 50/463* (2021.01)
*H01M 4/36* (2006.01)
*H01M 10/0525* (2010.01)

(52) U.S. Cl.
CPC ........... *H01M 4/0416* (2013.01); *H01M 4/13* (2013.01); *H01M 4/366* (2013.01); *H01M 10/04* (2013.01); *H01M 10/05* (2013.01); *H01M 10/058* (2013.01); *H01M 10/0525* (2013.01); *H01M 50/409* (2021.01); *H01M 50/463* (2021.01)

(56) References Cited

U.S. PATENT DOCUMENTS

| | | |
|---|---|---|
| 2014/0045056 A1 | 2/2014 | Yamami et al. |
| 2015/0056494 A1 | 2/2015 | Honda |
| 2016/0056470 A1 | 2/2016 | Yamaguchi et al. |

FOREIGN PATENT DOCUMENTS

| | | | |
|---|---|---|---|
| JP | 2009-099558 A | | 5/2009 |
| JP | 2010-205429 A | | 9/2010 |
| JP | 2010205429 A | * | 9/2010 |
| JP | 2012-043752 A | | 3/2012 |
| JP | 2013-232425 A | | 11/2013 |
| JP | 2014-067633 A | | 4/2014 |
| JP | 2015-118875 A | | 6/2015 |
| WO | WO 2014/157415 A1 | | 10/2014 |

OTHER PUBLICATIONS

European Office Action, dated Feb. 20, 2019, in European Application No. 16 85 3279.

* cited by examiner

ENERGY STORAGE DEVICE

TECHNICAL FIELD

The present invention relates to an energy storage device equipped with a separator including an insulating layer on its surface.

BACKGROUND ART

Conventionally, an energy storage device equipped with an energy storage element has been known in which a separator is interposed between a positive electrode having a positive composite layer and a positive composite layer non-forming part and a negative electrode including a negative composite layer and a negative composite layer non-forming part. The positive composite layer non-forming part and the negative composite layer non-forming part are projected in opposite directions.

A material used for the separator (e.g., polypropylene, polyethylene, or the like) is contracted by heat to some extent. Accordingly, the separator is disposed to project more than ends of the positive composite layer and the negative composite layer to prevent short circuit between the positive electrode and the negative electrode due to heat contraction of the separator.

Patent Literature 1 focuses on a point that a positive electrode non coated portion side tends to be a high temperature as compared with a negative electrode non-coated portions side when the heat generated by overcharge or the like is stored inside a secondary battery. Patent Literature 1 discloses a secondary battery that appropriately prevents short circuit even when its temperature rises by making the projection amount of a separator on a positive electrode non-coated portion side be not less than two times of the projection amount of the separator on a negative electrode non coated portion side (paragraphs 0010, 0027, etc.).

PRIOR ART DOCUMENTS

Patent Documents

Patent Document 1: JP-A-2012-043752

SUMMARY OF THE INVENTION

Problems to be Solved by the Invention

The inventor of the invention has found that the manufacturing time of the energy storage device can be shortened by causing electrolyte to efficiently penetrate into the positive composite layer in a process of injecting the electrolyte when the energy storage device equipped with a separator having an insulating layer on its surface opposing a positive electrode is manufactured.

An object of the invention is to shorten the manufacturing time of an energy storage device by causing electrolyte to efficiently penetrate into a positive composite layer in a process of injecting the electrolyte.

Means for Solving the Problems

A first aspect of the invention that aims to solve the above-mentioned problem is an energy storage device including: a negative electrode including a negative composite layer on a negative electrode collector foil and a negative composite layer non-forming part along a side of the negative electrode collector foil; a positive electrode including a positive composite layer on a positive electrode collector foil and a positive composite layer non-forming part along a side of the positive electrode collector foil; and a separator including an insulating layer on its surface opposing the positive electrode. The negative electrode and the positive electrode are layered with a separator interposed therebetween. The negative composite layer non-forming part and the positive composite layer non-forming part are disposed in opposite directions to each other. A part of the negative composite layer non-forming part is connected to a negative electrode current collector, and a part of the positive composite layer non-forming part is connected to a positive electrode current collector. An end S1 on a side of the negative electrode current collector of the separator is projected more than an end P1 on the side of the negative electrode current collector of the positive composite layer, and an end S2 on a side of the positive electrode current collector of the separator is projected more than an end P2 on the side of the positive electrode current collector of the positive composite layer. A distance W2 from the end P2 of the positive composite layer to the end S2 of the separator is smaller than a distance W1 from the end P1 of the positive composite layer to the end S1 of the separator.

The above-mentioned first aspect of the invention makes it possible to shorten the manufacturing time of the energy storage device by causing the electrolyte to efficiently penetrate into the positive composite layer in an injection process of the electrolyte.

Advantages of the Invention

The invention makes it possible to shorten the manufacturing time of the energy storage device equipped with the separator including the insulating layer on its surface opposing the positive electrode.

MODE FOR CARRYING OUT THE INVENTION

Hereinafter, embodiments of the invention will be described with reference to the drawings. The embodiments apply the invention to a lithium ion battery that is a nonaqueous electrolyte battery as an energy storage device.

First Embodiment

An energy storage device 1 according to a first embodiment will be described with reference to FIG. 1 to FIG. 7.

Figure 1:
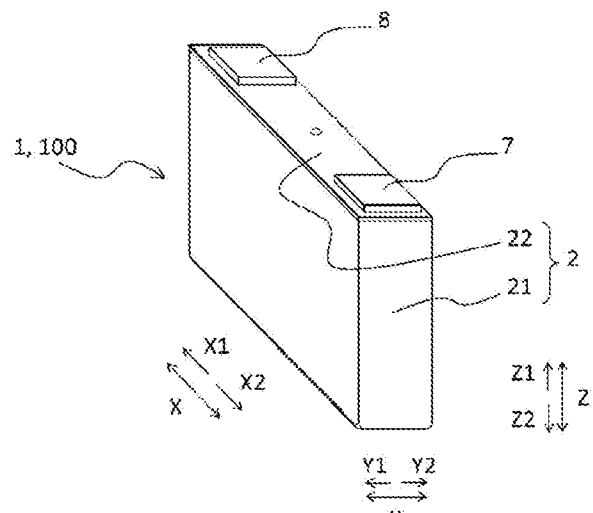
FIG. 1 is a perspective view illustrating an energy storage device according to a first embodiment.

The energy storage device 1 illustrated in FIG. 1 is a nonaqueous electrolyte battery, specifically a nonaqueous electrolyte secondary battery, and more specifically a lithium ion battery. The energy storage device 1 is mounted on, for example, an electric vehicle (EV) or a hybrid vehicle (HEV), and supplies electric power to a power source that operates with electric energy.

Figure 2:
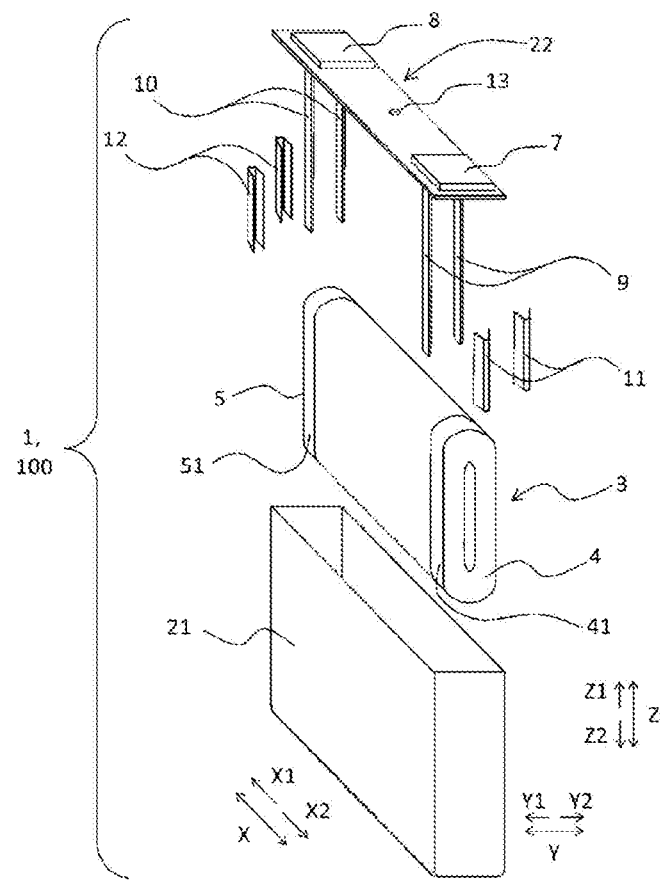
FIG. 2 is an exploded perspective view illustrating the energy storage device according to the first embodiment.
Figure 3:
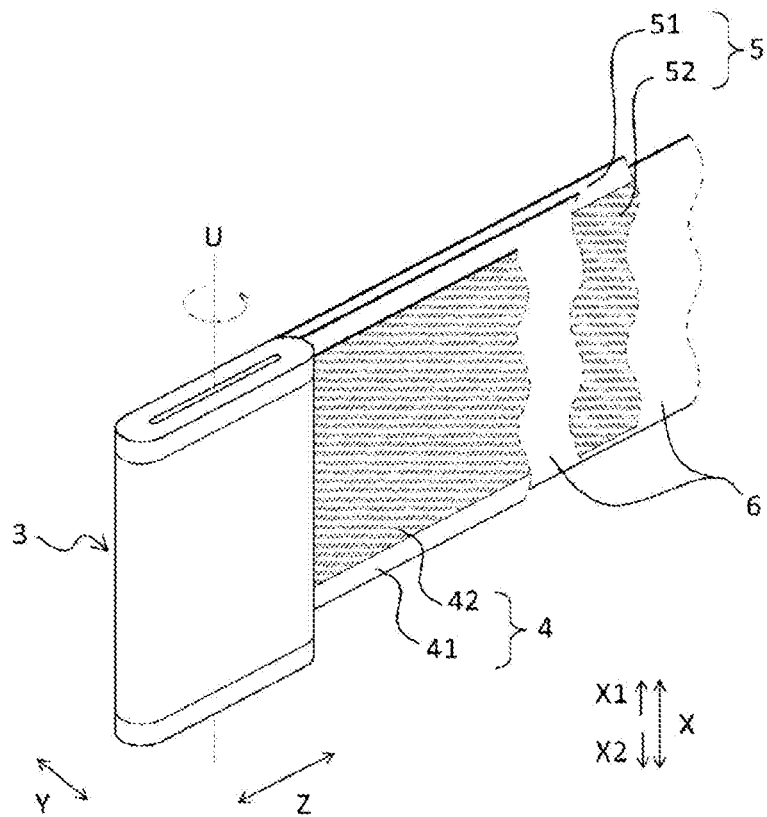
FIG. 3 is an exploded perspective view illustrating an energy storage element of the energy storage device according to the first embodiment.

As illustrated in FIG. 2, the energy storage device 1 includes an energy storage element 3 that is housed in an outer case 2 with nonaqueous electrolyte not shown in the drawing. A liquid like electrolyte is used as the electrolyte of the invention.

The outer case 2 has a case body 21 and a lid 22. The case body 21 has a substantially rectangular parallelepiped shape as a whole, and an opening is formed on its upper end surface side. The case body 21 can be made of a metal such as aluminum or an aluminum alloy. The case body 21 includes a bottom wall, and four side walls rising up from side rims of the bottom wall.

The opening has a rectangular shape having a width dimension in an X direction longer than a width dimension in a Y direction perpendicular to the x direction. The energy storage element 3 is housed and a nonaqueous electrolyte is injected inside the case body 21. The energy storage element 3 is housed in the case body 21 such that a longitudinal direction of the case body 21 and a longitudinal direction of the energy storage element 3 are matched. As described below, the energy storage device 3 is formed by winding a positive electrode 4 and a negative electrode 5 around a winding axis U with a separator 6 interposed between the positive electrode 4 and the negative electrode 5 to be a substantially oval shape. In the negative electrode 5, a negative composite layer non-forming part 51 is projected on an X1 direction side more than an end S1 of the separator 6 on a negative electrode current collector side. In the positive electrode 4, a positive composite layer non-forming part 41 is projected on an X2 direction side more than an end S2 of the separator 6 on a positive electrode current collector side.

On the lid 22, a positive electrode terminal 7, a negative electrode terminal 8, positive electrode current collectors 9, negative electrode current collectors 10, and an inlet 13 are provided. The lid 22 has a substantially rectangular shape as a whole, and has a substantially same shape as the opening. The lid 22 is joined with the case body 21 to seal the opening of the case body 21. Note that the lid 22 can be made of a material such as aluminum, an aluminum alloy, or the like. An outer rim of the lid 22 and the opening of the case body 21 are designed to be engaged, and the outer case 2 can be formed by welding the engaged portion.

On an outer surface of the lid 22, which is an upper surface thereof, the positive electrode terminal 7 and the negative electrode terminal 8 are disposed. Specifically, the positive electrode terminal 7 is disposed on the X2 direction side in the X direction (longitudinal direction) of the lid 22, and the negative electrode terminal 8 is disposed on the X1 direction side in the X direction (longitudinal direction) of the lid 22.

The lid 22 includes the inlet 13 that passes through the outer surface of the lid 22 and an inner surface of the lid 22. Specifically, the inlet 13 is formed at a portion near substantially the center in the X direction of the lid 22 and near substantially the center in the Y direction of the lid 22. In a step of injecting the electrolyte, the electrolyte is injected inside the outer case 2 via the inlet 13. After the electrolyte is injected, the inlet 13 is sealed by a liquid stopper.

The two positive electrode current collectors 9 extending from a lower surface of the lid 5 to a lower direction are electrically connected to the positive electrode terminal 7.

The positive electrode current collector 9 has a long and narrow shape that extends along the positive composite layer non-forming part 41 (the part where a positive electrode collector foil is exposed) of the positive electrode 4 to be described below. The two positive electrode current collectors 9 are disposed such that their plate surfaces are opposed. The positive electrode current collector 9 is formed of an electrical conductive material, and can be manufactured using, for example, an aluminum alloy plate or the like.

The positive composite layer non-forming part 41 is sandwiched by the positive electrode current collectors 9 as well as clips 11, and electrically connected thereto as illustrated in FIG. 2. It is preferable that the clips 11 be formed of a material having substantially the same resistance value as that of the material of the positive electrode current collectors 9 and the positive composite layer non-forming part 41 to be connected thereto. For example, the clip 11 can be manufactured by using, for example, an aluminum alloy or the like.

The two negative electrode current collectors 10 extending from the lower surface of the lid 5 to the lower direction are electrically connected to the negative electrode terminal 8.

The negative electrode current collector 10 has a long and narrow shape that extends along the negative composite layer non-forming part 51 (part where a negative electrode collector foil is exposed) of the negative electrode 5 to be described below. The two negative electrode current collectors 10 are disposed such that their plate surfaces are opposed. The negative electrode current collector 10 is formed of an electrical conductive material, and can be manufactured using, for example, a copper alloy plate or the like.

The negative composite layer non-forming part 51 is sandwiched by the negative electrode current collectors 10 as well as clips 12, and electrically connected thereto as illustrated in FIG. 2. It is preferable that the clips 12 be formed of a material having substantially the same resistance value as that of the material of the negative electrodes current collectors 10 and the negative composite layer non-forming part 51 to be connected thereto. The clip 12 can be manufactured by using, for example, a copper alloy or the like.

As illustrated in FIG. 3 to FIG. 6, the positive electrode 4 includes the positive electrode current collector foil composed of an aluminum alloy foil, and positive composite layers 42 including a positive active material on surfaces of the positive electrode current collector foil. The positive active material is not specifically limited, and various positive active materials can be used.

The positive electrode 4 includes the positive composite layers 42 and the positive composite layer non-forming part 41 on the X2 direction side of the positive electrode current collector foil. The end of the positive composite layer 42 on the X1 direction (direction in which the negative composite layer non-forming part 51 projects) side is an end P1 of the positive composite layer. The end of the positive composite layer 42 on the X2 direction (direction in which the positive composite layer non-forming part 41 projects) side is an end P2 of the positive composite layer. A portion of the positive composite layer non-forming part 41 is projected on the X2 direction side from the end S2 of the separator 6.

Figure 6:
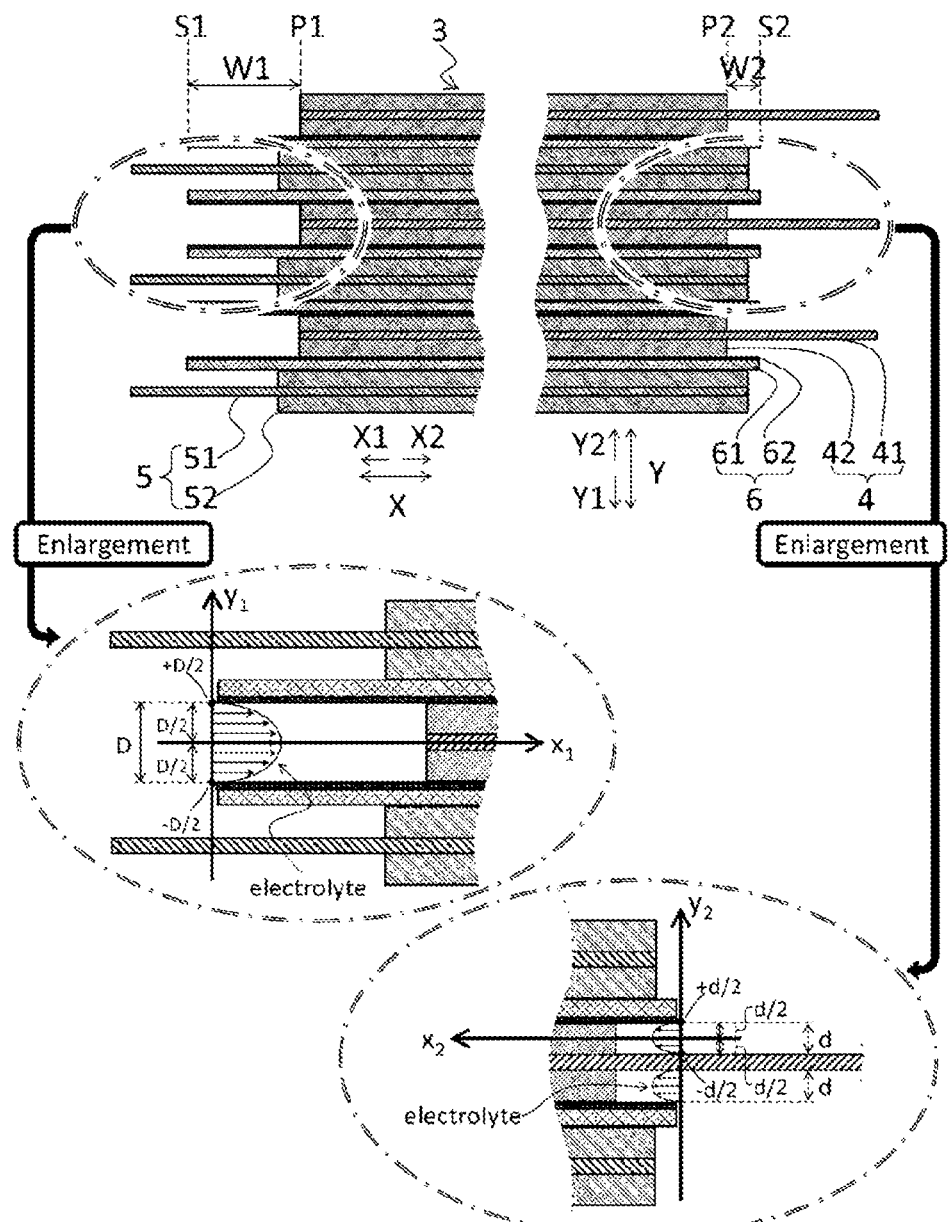
FIG. 6 is a cross sectional view in the of the X-Y plane of the energy storage element of the energy storage device according to the first embodiment in a process of injecting electrolyte.

The width of the positive electrode 4 in the Y direction is a thickness of the positive electrode 4, and the thickness of the positive electrode 4 is "D" (see FIG. 6). The width of the positive composite layer 42 in the Y direction is a thickness of the positive composite layer 42, and the thickness of the positive composite layer 42 is "d" (see FIG. 6).

As illustrated in FIG. 3 to FIG. 6, the negative electrode 5 includes the negative electrode collector foil formed of a copper alloy foil and negative composite layers 52 including a negative active material on surfaces of the negative electrode collector foil. The negative active material is not specifically limited, and various negative active materials can be used.

The negative electrode 5 includes the negative composite layers 52 and the negative composite layer non-forming part 51 on the X1 direction side of the negative electrode collector foil. Furthermore, a portion of the negative composite layer non-forming part 51 is projected on the X1 direction side from the end S1 of the separator 6.

In the X direction, the width of the negative composite layer 52 is larger than the width of the positive composite layer 42. The both ends in the X direction of the negative composite layer 52 is formed to extend on outer sides more than the both ends in the X direction of the positive composite layer 42.

The separator 6 is disposed between the positive electrode 4 and the negative electrode 5. In the X direction, the width of the separator 6 is larger than the width of the positive composite layer 42 and the width of the negative composite layer 52. The both ends in the X direction of the separator 6 are formed to extend on the outer sides more than the both ends in the X direction of the positive composite layer 42 and the negative composite layer 52.

The end on the X1 direction (the direction in which the negative composite layer non-forming part 51 projects) side of the separator 6 is the end S1 of the separator 6. The end S1 of the separator 6 is disposed to project on the outer side more than the ends in the X1 direction of respective the positive composite layer 42 and the negative composite layer 52 in the X1 direction.

The end on the X2 direction (direction in which the positive composite layer non-forming part 41 projects) side of the separator 6 is the end S2 of the separator 6. The end S2 of the separator 6 is disposed to project on the outer side more than the ends in the X2 direction of respective the positive composite layer 42 and the negative composite layer 52.

The distance from the end P1 of the positive composite layer 42 to the end S1 of the separator 6 is W1. The distance from the end P2 of the positive composite layer 42 to the end S2 of the separator 6 is W2.

Figure 4:
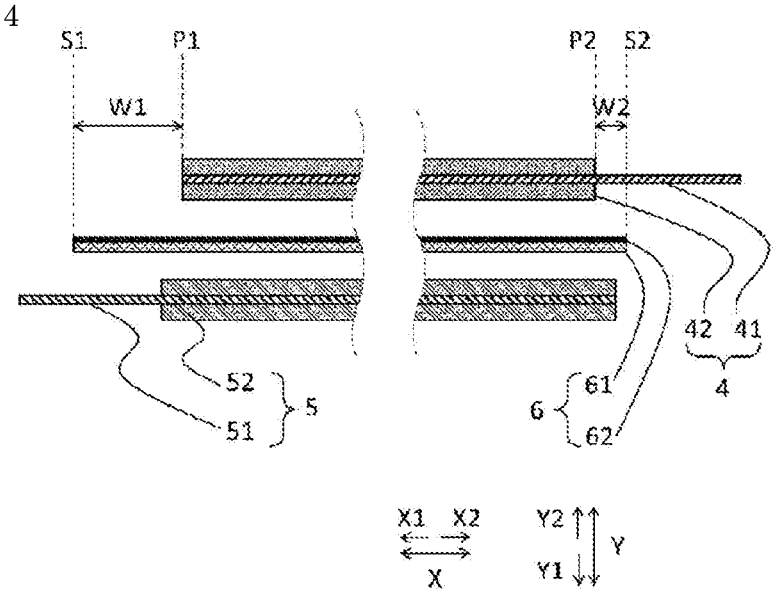
FIG. 4 is a diagram illustrating a mode in which a positive electrode and a negative electrode are disposed with a constant interval with a separator interposed therebetween.

In the separator 6, as illustrated in FIG. 4, an insulating layer 62 is formed on a surface, which is opposed to the positive electrode 4, of a substrate 61 such as a microporous membrane, a non-woven fabric, or the like having insulation properties. Furthermore, FIG. 4 illustrates a mode in which the positive electrode 4 and the negative electrode 5 are disposed with a constant distance with the separator 6 interposed therebetween. Note that the insulating layer 62 of the separator 6 is abbreviated in FIG. 3.

The substrate 61 of the separator 6 is not specifically limited as long as having insulating properties. A microporous membrane, a non-woven fabric, or the like can be used as the substrate 61, and a material forming the substrate 61 includes, for example, polyolefin resin such as polyethylene, polypropylene, or the like. These materials may be used independently, or may be used by combining two or more of the materials.

The insulating layer 62 formed on the surface of the substrate 61 opposing the positive electrode 4 can be formed by applying a slurry for forming an insulating layer including inorganic particles, a binder, and a solvent and drying it.

The binder used for forming the insulating layer 62 is not specifically limited as far as it plays roles of biding inorganic particles to each other and biding inorganic particles and the substrate 61. As the binder, for example, a solvent-based binder such as polyvinylidene fluoride (PVdF) or polytetrafluoroethylene (PTFE); an aqueous binder such as styrene-butadiene rubber (SBR) or a polyvinyl alcohol (PVA), or the like can be used. These binders may be independently used, or may be used by combining not less than two of them. The solvent-based binder denotes a binder that is used by being dissolved or dispersed in an organic solvent such as N-methylpyrrolidone (NMP). The aqueous binder denotes a binder that is used by being dissolved or dispersed in a solvent whose main component is water.

The inorganic particles used for the insulating layer 62 is not specifically limited, and for example, oxide-based ceramics such as silica, alumina, boehmite, titania, zirconia, magnesia, yttria, or zinc oxide; nitride-based ceramics such as silicon nitride, titanium nitride, or boron nitride; ceramics such as silicon carbide, calcium carbonate, aluminum sulfate, aluminum hydroxide, kaolin clay, kaolinite, or calcium silicate; a glass fiber, or the like can be used. These inorganic particles may be independently used, or may be used by combining not less than two of them.

The average particle size (D50) of the inorganic particles is not specifically limited as far as they can be dispersed by a binder to be bound at a predetermined site. The average particle size (D50) of the inorganic particles is preferably not more than 20 μm, more preferably not more than 10 μm, and still more preferably not more than 5 μm. Also, the average particle size (D50) of the inorganic particles is preferably not less than 0.01 μm, more preferably not less than 0.1 μm, and still more preferably not less than 0.5 μm.

Alternatively, a plurality of inorganic particles different in their average particle sizes (D50) may be included in the insulating layer 62. In this case, the average particle size (D50) of the largest inorganic particles is preferably not less than 1 μm and not more than 20 μm, and the average particle size (D50) of the smallest inorganic particles is preferably not less than 0.01 μm and less than 1 μm. This generates an appropriate gap between the positive composite layer 42 and the insulating layer 62, which readily causes the electrolyte to penetrate into the positive composite layer, making it possible to further shorten the manufacturing time of the energy storage device, which is preferable.

Note that the average particle size (D50) of the inorganic particles can be measured by using a laser diffraction particle size analyzer (name of the analyzer: SALD-2200 (Shimadzu Corporation), measuring control software is Wing SALD-2200).

The porosity of the insulating layer 62 is not specifically limited and can be appropriately set. When the porosity of the insulating layer 62 is set not less than 40%, the electrolyte may be likely to be absorbed and held in the insulating layer 62. By setting the porosity of the insulating layer 62 to be not less than 40%, as described below, since the possibility that the electrolyte is not efficiently supplied to the positive composite layer 42 becomes high, availability of applying the present invention may improve. That is, the porosity in the insulating layer 62 is preferably not less than 40%, more preferably not less than 50%, and still more preferably not less than 60%.

The content of the inorganic particles in the insulating layer 62 is not specifically limited, and can be appropriately set. The content of the inorganic particles is preferably not more than 99.9 wt. %, more preferably not more than 99 wt. %, and still more preferably not more than 98 wt. %, and still more preferably not more than 95 wt. % with respect to the total amount of the inorganic particles and the binder. Also, the content of the inorganic particles is preferably not less than 50 wt. %, more preferably not less than 80 wt. %, and still more preferably not less than 90 wt. % with respect to the total amount of the inorganic particles and the binder.

As compared with the energy storage device including a separator composed of only a substrate, in the energy storage device including the separator 6 in which the insulating layer 62 is formed on the surface of the substrate 61, even when the energy storage device is used under a condition that is not normally foreseen, for example, even when abnormal heat generation occurs in the energy storage device, the separator 6 is less likely to be heat shrunk, so that electrical contact between the positive electrode and the negative electrode can be suppressed.

The electrolyte is not specifically limited as long as it is a liquid like state, and can include a supporting salt or a solvent. Viscosity of the electrolyte is not specifically limited, and can be appropriately set. Making the viscosity of the electrolyte under a circumstance of 25° C. be not more than 10 mPa*sec may cause the electrolyte to efficiently penetrate into the positive composite layer. That is, the viscosity of the electrolyte under a circumstance of 25° C. is preferably not more than 10 mPa*sec, more preferably not more than 5 mPa*sec, and still more preferably not more than 3.5 mPa*sec.

As the supporting salt, a supporting electrolyte typically used for a nonaqueous electrolyte battery can be employed. The supporting salt includes, for example, $LiBF_4$, $LiPF_6$, $LiClO_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiB(C_2O_4)_2$, $LiC(C_2F_5SO_2)_3$, or the like, and one of the compounds or a combination of not less than two selected from the compounds can be used.

As the solvent, a solvent typically used in a nonaqueous electrolyte battery can be employed. The solvent includes, for example, propylene carbonate (PC), ethylene carbonate (EC), dimethyl carbonate (DMC), diethyl carbonate (DEC), ethyl methyl carbonate (EMC), or the like, and one of the compounds or a combination of not less than two selected from the compounds can be used.

In the processing for injecting the electrolyte, the electrolyte is injected inside the outer case 2 via the inlet 13. The injected electrolyte may be, for example, accumulated on the bottom wall of the case body 21 composing the outer case 2 to be introduced on both ends in the X direction of the energy storage element 3 (a portion at which the positive composite layer non-forming part 41 is overlapped, and a portion at which the negative composite layer non-forming part 51 is overlapped), or may travel an outer surface of the energy storage element 3 to be introduced at the both ends in the X direction of the energy storage element 3.

The electrolyte introduced to the both ends in the X direction of the energy storage element 3 penetrates toward near the center in the X direction of the composite layers (positive composite layer and the negative composite layer) from the both ends in the X direction of the composite layers. Specifically, the electrolyte introduced to the end in the X1 direction of the energy storage element 3 (the portion in which the negative composite layer non-forming part 51 is overlapped) penetrates toward the X2 direction from the ends in the X1 direction of respective the composite layers. Similarly, the electrolyte introduced to the end in the X2 direction of the energy storage element 3 (the portion in which the positive composite layer non-forming part 41 is overlapped) penetrates toward the X1 direction from the ends in the X2 direction of respective the composite layer.

The inventor of the present invention has found that, in the process in which the electrolyte penetrates into each of the composite layers, the process in which the electrolyte penetrates into the positive composite layer 42 takes more time as compared with the process in which the electrolyte penetrates into the negative composite layer 52. That is, in order to shorten the manufacturing time of the energy storage device 1, it may be effective to cause the electrolyte to efficiently penetrate into the positive composite layer 42.

A cause of taking more time in the process in which electrolyte penetrates into the positive composite layer 42 as compared with the process in which the electrolyte penetrates into the negative composite layer 52 may be that the insulating layer 62 of the separator 6 absorbs and holds more electrolyte to have a high liquid retaining property as compared with the substrate 61 of the separator 6. The inorganic particles included in the insulating layer 62 may have a good affinity with the electrolyte, so that the insulating layer 62 of the separator 6 may have a high liquid retaining property of the electrolyte as compared with the substrate 61 of the separator 6.

Figure 5:
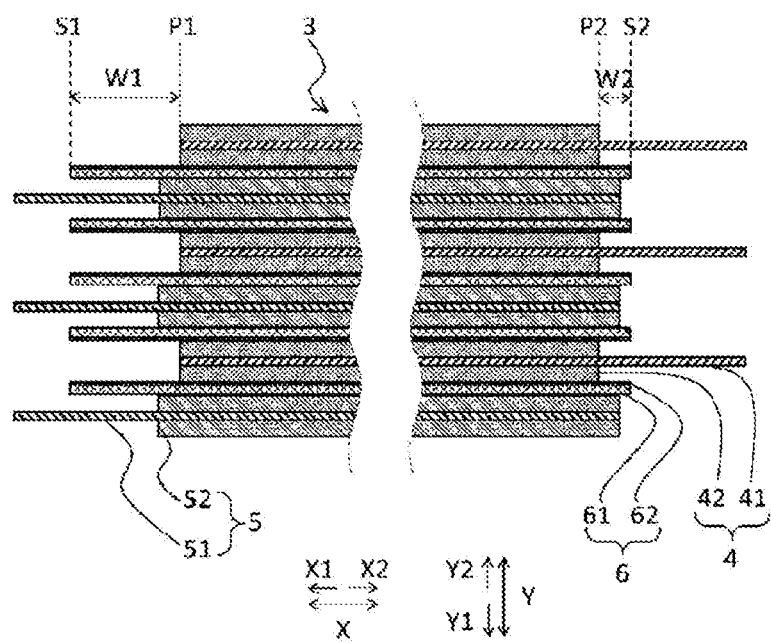
FIG. 5 is a cross sectional view in an X-Y plane of the energy storage element of the energy storage device according to the first embodiment.

As illustrated in FIG. 4 and FIG. 5, the positive electrode 4 is sandwiched by the insulating layers 62 of the separators 6 in the Y direction, and the negative electrode 5 is sandwiched by the substrates 61 of the separators 6 in the Y direction.

Herein, the process is examined in which the electrolyte penetrates into each of the composite layers from the end in the X1 direction of the energy storage element 3 (the portion in which the negative composite layer non-forming part 51 is overlapped).

In the process in which the electrolyte penetrates into the positive composite layer 42 from the X1 direction, the space in which the insulating layers 62 of the separators 6 are opposed becomes a route that introduces the electrolyte to the end P1 of the positive composite layer 42. After the electrolyte reaches the end P1 of the positive composite layer 42, the electrolyte sequentially penetrates into the positive composite layer 42.

In the process of reaching the end P1 of the positive composite layer 42 from the end in the X1 direction of the energy storage element 3, some of the electrolyte may be absorbed and held in the insulating layer 62 having a relatively high liquid retaining property. That is, not all the electrolyte that travels the space in which the insulating layers 62 of the separators 6 are opposed to each other may be introduced to the end P1 of the positive composite layer 42, so that the electrolyte may not be efficiently supplied to the end P1 of the positive composite layer 42.

In the process in which the electrolyte penetrates into the negative composite layer 52 from the X1 direction, the space in which the substrate 61 of the separator 6 and the negative electrode collector foil (negative composite layer non-forming part 51) are opposed becomes a route that introduces the electrolyte to the end in the X1 direction of the negative composite layer 52. After the electrolyte reaches the end in the X1 direction of the negative composite layer 52, the electrolyte sequentially penetrates into the negative composite layer 52.

In the process of reaching the end in the X1 direction of the negative composite layer 52 from the end in the X1 direction of the energy storage element 3, that the electrolyte is absorbed and held in the substrate 61 and the negative electrode collector foil may rarely occur. That is, almost no electrolyte that travels in the space in which the substrate 61 of the separator 6 and the negative electrode collector foil are opposed may be absorbed in the substrate 61 and the negative electrode collector foil and almost all the electrolyte may be introduced to the end in the X1 direction of the negative composite layer 52, so that the electrolyte may be efficiently supplied to the end in the X1 direction of the negative composite layer 52.

Accordingly, when the process is examined in which the electrolyte penetrates into each of the composite layers from the end in the X1 direction of the energy storage element 3, in the positive composite layer 42 sandwiched by the insulating layers 62 in the Y direction, some of the electrolyte may be readily absorbed and held by the insulating layers 62 as compared with the negative composite layer 52 sandwiched by the substrates 61 in the Y direction. This may make the electrolyte be not efficiently supplied to the end P1 of the positive composite layer 42, so that the process in which the electrolyte penetrates into the positive composite layer 42 may require more time as compared with the process in which the electrolyte penetrates into the negative composite layer 52 sandwiched by the substrates 61 in the Y direction. This may be because the insulating layer 62 absorbs and holds more electrolyte as compared with the substrate 61 and the negative electrode collector foil, so that it has a high liquid retaining property.

Note that the negative electrode collector foil (negative composite layer non-forming part 51) may have a property of absorbing a small amount of the electrolyte and hardly absorb the electrolyte like the substrate 61 of the separator 6.

Herein, the process is examined in which the electrolyte penetrates into each of the composite layers from the end in the X2 direction of the energy storage element 3 (the portion in which the positive composite layer non-forming part 41 is overlapped).

In the process in which the electrolyte penetrates into the positive composite 42 from the X2 direction, the space in which the insulating layer 62 of the separator 6 and the positive electrode collector foil (positive composite layer non-forming part 41) are opposed becomes a route that introduces the electrolyte to the end P2 of the positive composite layer 42. After the electrolyte reaches the end in the X2 direction of the positive composite layer 42, the electrolyte sequentially penetrates into the positive composite layer 42.

In the process of reaching the end P2 of the positive composite layer 42 from the end in the X2 direction of the energy storage element 3, some of the electrolyte may be absorbed and held in the insulating layer 62 having a relatively high liquid retaining property. That is, not all the electrolyte that travels the space in which the insulating layer 62 of the separator 6 and the positive electrode collector foil (positive composite layer non-forming part 41) are opposed may be introduced to the end P2 of the positive composite layer 42, so that the electrolyte may not be efficiently supplied to the end P2 of the positive composite layer 42.

In the process in which the electrolyte penetrates into the negative composite layer 52 from the X2 direction, the space in which the substrates 61 of the separator 6 are opposed to each other becomes a route that introduces the electrolyte to the end in the X2 direction of the negative composite layer 52. After the electrolyte reaches the end in the X2 direction of the negative composite layer 52, the electrolyte sequentially penetrates into the negative composite layer 52.

In the process of reaching the end in the X2 direction of the negative composite layer 52 from the end in the X2 direction of the energy storage element 3, the electrolyte may be hardly absorbed and held in the substrate 61. That is, the electrolyte that travels the space in which the substrates 61 of the separators 6 are opposed to each other may be hardly absorbed in the substrate 61, and substantially all thereof may be introduced to the end in the X2 direction of the negative composite layer 52, so that the electrolyte may be efficiently supplied to the end in the X2 direction of the negative composite layer 52.

Therefore, when examining the process in which the electrolyte penetrates into each of the composite layers from the end in the X2 direction of the energy storage element 3, in the positive composite layer 42 sandwiched between the insulating layers 62 in the Y direction, some of the electrolyte may be readily absorbed in the insulating layer 62 as compared with the negative composite layer 52 sandwiched between the substrates 61 in the Y direction. This prevents the electrolyte from being efficiently supplied to the end P2 of the positive composite layer 42, so that the process in which the electrolyte penetrates into the positive composite layer 42 may take more time as compared with the process in which the electrolyte penetrates into the negative composite layer 52 sandwiched between the substrates 61 in the Y direction. This may be because the insulating layer 62 absorbs and holds more electrolytes to have a high liquid retaining property as compared with the substrate 61 as described above.

Note that the positive electrode collector foil (positive composite layer non-forming part 41) may have a property of absorbing a small amount of the electrolyte and hardly absorb the electrolyte like the substrate 61 of the separator 6.

According to the above description, when manufacturing the energy storage device 1 equipped with the separator 6 having the insulating layer 62 on its surface opposing the positive electrode 4, in the process of injecting the electrolyte, the process in which the electrolyte penetrates into the positive composite layer 42 may take more time as compared with the process in which the electrolyte penetrates into the negative composite layer 52.

Also, in order to increase the density of the positive composite layer 42 to increase the energy density of the energy storage device 1, means of reducing the porosity of the positive composite layer 42 can be employed. When the porosity of the positive composite layer 42 is reduced, the electrolyte may become less likely to penetrate into the positive composite layer 42, and the process in which the electrolyte penetrates into the positive composite layer 42 may take further more time. That is, in the energy storage device in which the porosity of the positive composite layer 42 is small, availability of the present invention that shortens the manufacturing time of the energy storage device may improve.

The porosity of the positive composite layer 42 is preferably not more than 40%, more preferably not more than 35%, and still more preferably not more than 30%.

Furthermore, when, for example, the process of injecting the electrolyte under a depressurized environment, unless the electrolyte penetrates into all the positive composite layer during the process of injecting the electrolyte, that is, during when the energy storage device in a state where the inlet 13 is not sealed by a liquid stopper is held under a depressurized environment, a portion exists in which the electrolyte is not penetrated into the positive composite layer of a completed energy storage device. The portion in which the electrolyte is not penetrated into the positive composite layer cannot contribute to charge-discharge reaction, which can result in lowering the capacity of the energy storage device. That is, applying the present invention may make it possible to reduce a disadvantage that the electrolyte is not fully penetrated into the positive composite layer to suppress lowering the capacity of the energy storage device.

The inventor of the present invention has found that the electrolyte can be efficiently penetrated into the positive composite layer 42 by defining a distance W1 from the end P1 of the positive composite layer 42 to the end S1 of the separator 6, and a distance W2 from the end P2 of the positive composite layer 42 to the end S2 of the separator 6, and has completed the present invention.

The electrolyte injected inside the outer case 2 reaches the ends (P1 and P2) in the X direction of the positive composite layer 42 from respective the ends in the X direction of the energy storage element 3. Specifically, to the end P1 of the positive composite layer 42, the electrolyte travels in the space in which the insulating layers 62 are opposed to each other as a route. Similarly, to the end P2 of the positive composite layer 42, the electrolyte travels in the space in which the insulating layer 62 of the separator 6 and the positive electrode collector foil are opposed as a route.

That is, as described below, after the electrolyte is injected, unless the time to when the electrolyte reaches the end P1 of the positive composite layer 42 and the time to when the electrolyte reaches the end P2 of the positive composite layer 42 are deviated, the time of penetration of the electrolyte in the positive composite layer 42 may be shortened.

The time to when the electrolyte reaches the end P1 of the positive composite layer 42 after the electrolyte is injected shall be T1. Similarly, the time to when the electrolyte reaches the end P2 of the positive composite layer 42 after the electrolyte is injected shall be T2.

When there is no deviation between T1 and T2, the electrolyte can start to penetrate into the positive composite layer 42 at substantially the same time from the end P1 and the end P2. Therefore, when there is no deviation between T1 and T2, when the electrolyte that penetrates into the X2 direction from the end P1 and the electrolyte that penetrates into the X1 direction from the end P2 penetrate to near substantially the center in the X direction of the positive composite layer 42, the electrolyte penetrates to all the positive composite layer 42.

Note that, the penetration velocity of the electrolyte into the positive composite layer 42 may be constant, and the magnitude of the velocity may also be same between when the electrolyte penetrates from the end P1 to the X2 direction and when the electrolyte penetrates from the end P2 to the X1 direction.

In contrast, when a deviation exists between T1 and T2, one of the penetration of the electrolyte to the X2 direction from the P1 or the penetration of the electrolyte from the end P2 to the X1 direction starts first. Therefore, when a deviation exists between T1 and T2, unless the electrolyte that penetrates into the X2 direction from the P1 and the electrolyte that penetrates into the X1 direction from the end P2 penetrate not to near substantially the center of the positive composite layer 42 in the X direction but to a portion deviated on the X1 direction side or the X2 direction side of the positive composite layer 42 in the X direction from respective the ends (the end P1 and the end P2), the electrolyte does not penetrate into all the positive composite layer 42. That is, when a deviation exists between T1 and T2, the electrolyte must penetrates to a far place deviated from near substantially the center of the positive composite layer 42 in the X direction from at least one of the ends (end P1 or end P2) of the positive composite layer 42 in the X direction (a portion deviated on the X1 direction side or the X2 direction side of the positive composite layer 42 in the X direction).

Furthermore, the penetration velocity of the electrolyte into the positive composite layer 42 may be slow as compared with the traveling velocity of the electrolyte to the end P1 or the end P2 of the positive composite layer 42 from the end S1 or the end S2 of the separator. This may be because the electrolyte sequentially penetrates into infinite holes existing in the positive composite layer 42 inside the positive composite layer 42, whereas the electrolyte travels the space in which the insulating layers 62 are opposed to each other or the space in which the insulating layer 62 and the positive electrode collector foil are opposed as a route from the end S1 or the end S2 of the separator to the end P1 or the end P2 of the positive composite layer 42.

According to the above description, when no deviation exists between T1 and T2, a penetration time of the electrolyte into the positive composite layer 42 may be shortened as compared with the case where a deviation exists between T1 and T2.

The inventor of the invention has tried to shorten the penetration time of the electrolyte into the positive composite layer 42 by defining the distance W1 from the end P1 of the positive composite layer 42 to the end S1 of the separator 6 and the distance W2 form the end P2 of the positive composite layer 42 to the end S2 of the separator 6 to reduce the deviation between T1 and T2.

As illustrated in FIG. 5 and FIG. 6, the space in which the insulating layers 62 of the separator 6 are opposed to each other that is a route for introducing the electrolyte to the end P1 of the positive composite layer 42 has a wide extent as compared with the space in which the insulating layer 62 of the separator 6 and the positive electrode collector foil (positive composite layer non-forming part 41) are opposed that is a route for introducing the electrolyte to the end P2 of the positive composite layer 42. That is, when the distance W1 and the distance W2 are equal, the electrolyte that travels the space in which the insulating layers 62 of the separators 6 are opposed to each other may be efficiently introduced to the end (end P1) of the positive composite layer 42 as compared with the electrolyte that travels the space in which the insulating layer 62 of the separator 6 and the positive electrode collector foil (positive composite layer non-forming part 41) are opposed. That is, defining the distance W2 to be smaller than the distance W1 may make it possible to reduce the deviation between T1 and T2. The definitions of the distance W1 and the distance W2 can be estimated also by using the idea of plane Poiseuille flow as described below. As described above, the insulating layer 62 has a relatively high liquid retaining property of the electrolyte, so that the electrolyte may regularly penetrate into the insulating layer 62, and the idea of the plane Poiseuille flow may be satisfied under such a condition.

Figure 7:
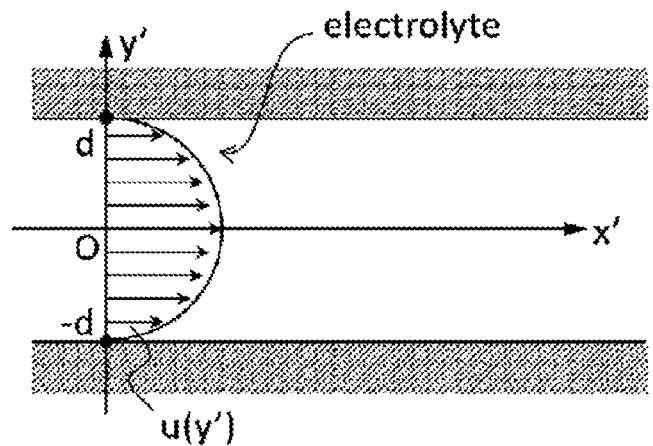
FIG. 7 is a schematic view illustrating plane Poiseuille flow in which the electrolyte flows between two parallel slabs.

FIG. 7 is a schematic diagram illustrating plane Poiseuille flow flowing through a space between two parallel slabs. Herein, the space between the two parallel slabs indicate a route formed by the insulating layers 62 of the separators 6 opposed to each other, or the route formed by the insulating layer 62 of the separator 6 and the positive electrode collector foil (positive composite layer non-forming part 41) that are opposed. In FIG. 7, the two slabs are parallel, and an x' axis is defined along the center plane between the two slabs, and a y' axis is defined in a direction perpendicular to the two slabs.

FIG. 7 is a schematic view of the electrolyte that travels between the two parallel slabs, and it is supposed that the traveling of the electrolyte is two dimensional steady flow, and has a velocity component only in one direction of the x' direction.

Typically, when traveling of the fluid is the two dimensional steady flow, and has a velocity component of in only one direction, the relation between pressure gradient (dp/dx') inside the fluid and second order differential ($d^2u/dy'^2$) of velocity is expressed by the following Formula (1).

$$dp/dx' = \mu(d^2u/dy'^2) \quad \text{Formula (1)}$$

Herein, "p" denotes pressure in each point in the fluid, "u" denotes velocity (flow velocity) in each point in the fluid, and denotes viscosity coefficient of the fluid.

When traveling of the fluid is two dimensional steady flow and has a velocity component only in one direction of x' direction, the pressure gradient (dp/dx') in the x' direction is constant, and a velocity component u in the x' direction can be expressed as u(y'). Since the pressure gradient (dp/dx') in the x' direction of the fluid is constant, Formula (2) is satisfied.

$$dp/dx' = -a \quad \text{Formula (2)}$$

Herein, "a" denotes a constant.

Formula (3) is derived from Formula (1) and Formula (2).

$$d^2u/dy'^2 = -(a/\mu) \quad \text{Formula (3)}$$

By integrating Formula (3) twice with respect to y', Formula (4) is derived.

$$u(y') = -(ay'^2/2) + c_1 y' + c_2 \quad \text{Formula (4)}$$

Herein, $c_1$ and $c_2$ denote integral constants.

The flow velocity becomes 0 (u(±d')=0) in the planes (y'=±d') on which the fluid is in contact with the slabs.

By solving the two equations obtained by assigning the above-mentioned condition (u(±d')=0 in y=±d') to Formula (4) as simultaneous equations related to $c_1$ and $c_2$, Formula (5) and Formula (6) are obtained.

$$c_1 = 0 \quad \text{Formula (5)}$$

$$c_2 = ad'^2/2\mu \quad \text{Formula (6)}$$

By assigning Formula (5) and Formula (6) to Formula (4), the flow velocity u(y') can be expressed by Formula (7).

$$u(y') = (ad'^2/2\mu)[1-(y'/d')^2] \quad \text{Formula (7)}$$

The volume that passes through any cross section perpendicular to the x' axis shall be flow rate (volume flow rate) Q. Herein, when the width of the two slabs (length in the depth direction (direction perpendicular to the x' axis and the y' axis)) is ω, the flow rate Q can be obtained by integrating the flow velocity u(y') from −d' to d' and multiplying it by the width ω as expressed by the following Formula (8).

[Formula 1]

$$Q = \omega \int_{-d'}^{d'} \frac{ad'^2}{2\mu}\left(1 - \left(\frac{y'}{d'}\right)\right) dy' = \frac{2}{3}\frac{ad'^3 \omega}{\mu} \quad \text{Formula (8)}$$

The average flow velocity $u_{ave}$ obtained by averaging the flow velocity u(y') across between the two slabs y'=[−d',d'] can be obtained by dividing the volume flow rate Q by 2dω as illustrated in the flowing Formula (9).

[Formula 2]

$$u_{ave} = \frac{Q}{2d'\omega} = \frac{ad'^2}{3\mu} \quad \text{Formula (9)}$$

[Electrolyte that Travels the Route in which the Insulating Layers 62 of the Separators 6 are Opposed to Each Other]

As illustrated in FIG. 6, the insulating layers 62 of the separators 6 are substantially parallel to each other, and an $x_1$ axis is defined along the center surface between the insulating layers 62 of the separators 6 and a $y_1$ axis is defined in a direction perpendicular to the insulating layer 62 of the separator 6. Traveling of the electrolyte that travels the route formed by the insulating layers 62 of the separators 6 opposed to each other may be two-dimensional steady flow depending on two components that are the $x_1$ direction and the $y_1$ direction, and may have a velocity component only in one direction of the $x_1$ direction.

On the surfaces ($y_1 = \pm D/2$) on which the electrode traveling the route formed by the insulating layers 62 of the separators 6 opposed to each other is in contact with the insulators 62 of the separators 6, the flow velocity of the electrolyte becomes 0 (u(±D/2)=0). That is, the average flow velocity $u_{ave(y1)}$ of the electrolyte traveling the route formed by the insulating layers 62 of the separators 6 opposed to each other can is obtained by averaging the flow velocity u(y1) across between the two slabs y1=[−D/2, D/2], so that it can be obtained by assigning d' in Formula (9) to d'=D. Accordingly, the average flow velocity $u_{ave(y1)}$ of the electrolyte travelling the route formed by the insulating layers 62 of the separators 6 opposed to each other is expressed by following Formula (10). In Formula (10), "a" denotes a constant, and "μ" denotes a viscosity coefficient of the electrolyte.

[Formula 3]

$$u_{ave(y1)} = \frac{aD^2}{3\mu} \quad \text{Formula (10)}$$

That is, the penetration of the electrolyte with respect to the positive composite layer 42 from the end P1 progresses by supply of the electrolyte traveling at the average flow velocity $u_{ave(y1)}$ to the route formed by the insulating layers 62 of the separators 6 opposed to each other. The electrolyte traveling at the average flow velocity $u_{ave(y1)}$ may be supplied from the end P1 to the positive composite layers 42 positioned in the respective Y1 and Y2 directions via the positive electrode collector foil.

[Electrolyte that Travels the Route in which the Insulating Layer 62 of the Separator 6 and the Positive Electrode Collector Foil are Opposed]

As illustrated in FIG. 6, the insulating layer 62 of the separator 6 and the positive electrode collector foil are substantially parallel. An X2 axis is defined along the center surface between the insulating layer 62 of the separator 6 and the positive electrode collector foil, and a $y_2$ axis is defined in a direction perpendicular to the insulating layer 62 of the separator 6 and the positive electrode collector foil. Traveling of the electrolyte that travels the route formed by the insulating layer 62 of the separator 6 and the positive electrode collector foil that are opposed may be two dimensional steady flow depending on two components that are the X2 direction and the $y_2$ direction, and may have a velocity component only in one direction of the $x_2$ direction.

On the surfaces (y1=±d/2) on which the electrolyte traveling the route formed by the insulating layer 62 of the separator 6 and the positive electrode collector foil is in contact with the insulating layer 62 of the separator 6 and the positive electrode collector foil, the flow velocity of the electrolyte becomes 0 (u(±d/2)=0). That is, the average flow velocity $u_{ave(y2)}$ of the electrolyte traveling the path formed by the insulating layer 62 of the separator 6 and the positive electrode collector foil that are opposed is obtained by averaging the flow velocity u($y_2$) across between the two slabs $y_2$=[−d/2, d/2], so that it can be obtained by substituting d'=d to d' in Formula 9.

Accordingly, the average flow velocity $u_{ave(y2)}$ of the electrolyte that travels the path formed by the insulating layers 62 of the separators 6 that are opposed is expressed by following Formula 11. In formula 11, "a" denotes a constant, and "μ" denotes a viscosity coefficient of the electrolyte.

[Formula 4]

$$u_{ave(y2)} = \frac{ad^2}{3\mu} \quad \text{Formula (11)}$$

That is, the penetration of the electrolyte with respect to the positive composite layer 42 from the end P2 progresses by supply of the electrolyte traveling at average flow velocity $u_{ave(y2)}$ to the route formed by the insulating layer 62 of the separator 6 and the positive electrode collector foil that are opposed.

Comparing Formula (10) and Formula (11) shows that $u_{ave(P1)}$ is larger than $u_{ave(P2)}$ because the squared value of the thickness D of the positive electrode 4 is larger than the squared value of the thickness d of the positive composite layer 42.

When the distance W1 equals the distance W2, the length of the route formed by the insulating layers 62 of the separators 6 that are opposed to each other and the route formed by the insulating layer 62 of the separator 6 and the positive electrode collector foil (positive composite layer non-forming part 41) that are opposed become equal.

That is, when the distance W1 and the distance W2 are equal, in the process of injecting the electrolyte, the electrolyte that travels the route formed by the insulating layers 62 that are opposed reaches the end (end P1) of the positive composite layer 42 earlier as compared with the electrolyte that travels the route formed by the insulating layer 62 and the positive electrode collector foil that are opposed depending on the magnitude relation of the average flow velocities, causing a deviation between T1 and T2. Accordingly, in order to reduce the deviation between T1 and T2, it is understood that it is effective to set the route formed by the insulating layer 62 and the positive electrode collector foil that are opposed shorter than the route formed by the insulating layers 62 that are opposed to each other.

The length of the route formed by the insulating layer 62 and the positive electrode collector foil that are opposed is W1, and the length of the route formed by the insulating layers 62 that are opposed to each other is W2, so that by satisfying the relation of W1>W2, the penetration of the electrolyte into the positive electrode 4 is efficiently performed. That is, satisfying the relation of W1>W2 enables the electrolyte to efficiently penetrate into the positive electrode 4, making it possible to shorten the manufacturing time of the energy storage device 1.

Second Embodiment

In a second embodiment of the invention,
the thickness of the positive electrode is "D",
the thickness of the positive composite layer is "d", and
the distance W2 is not less than $0.5(d^2/D^2)W1$ and not more than $2(d^2/D^2)W1$ in the energy storage device according to the first embodiment of the invention.

According to the above-mentioned second embodiment of the invention, in the injection process of the electrolyte, the electrolyte can be efficiently penetrated into the positive composite layer, so that the manufacturing time of the energy storage device can be shortened.

An energy storage device 100 according to the second embodiment will be described with reference to FIG. 1 to FIG. 7.

In the second embodiment, the energy storage device 100 will be described in which the distance W1 from the end P1 of the positive composite layer 42 to the end S1 of the separator 6, and the distance W2 from the end P2 of the positive composite layer 42 to the end S2 of the separator 6 are defined in a more preferable range. Furthermore, in the second embodiment, the same reference numerals are used for the same components as those in the first embodiment, and their description will be omitted.

As described above, the average flow velocity of the electrolyte supplied to the end P1 and the average flow velocity of the electrolyte supplied to the end P2 are respectively expressed by Formula (10) and Formula (11). That is, by adjusting the distance W1 and the distance W2 on the basis of the magnitudes of the average flow velocities of the electrolyte that travels respective the routes, the deviation between T1 and T2 can be reduced to cause the electrolyte to efficiently penetrate into the positive electrode 4.

Formula (10) and Formula (11) shows that the average flow velocity $u_{ave(P2)}$ of the electrolyte supplied to the end P2 is $d^2/D^2$ times of the average flow velocity $u_{ave(P1)}$ of the electrolyte supplied to the end P1. Herein, as is apparent from FIG. 4 to FIG. 6, it is understood that the thickness D of the positive electrode 4 is larger than the value obtained by multiplying two by the thickness d of the positive composite layer 42, so that the value of $d^2/D^2$ becomes less than ¼ in the first embodiment and the second embodiment of the invention.

That is, when the distance W1 and the distance W2 are equal, the average flow velocity $u_{ave(P2)}$ of the electrolyte supplied to the end P2 is $d^2/D^2$ times, which is less than ¼, of the average flow velocity $u_{ave(P1)}$ of the electrolyte supplied to the end P1, so that unless the electrolyte that penetrates from the ends (end P1 and end P2) penetrates to a portion deviated on the X2 direction side of the positive composite layer 42, the electrolyte does not penetrate into all the positive composite layer 42.

Thus, defining the distance W2 to be not less than $0.5(d^2/D^2)W1$ and not more than $2(d^2/D^2)W1$ may make it possible to suppress generation of a large deviation between T1 and T2. This makes the penetration toward the X2 direction from the end P1 of the positive composite layer 42 and the penetration toward the X1 direction from the end P2 of the positive composite layer 42 start without causing a large time deviation, so that the electrolyte penetrates into the positive electrode 4 more efficiently to shorten manufacturing time of the energy storage device 100.

Also, when the distance W2 is defined to be $(d^2/D^2)W1$, the penetration toward the X2 direction from the end P1 of the positive composite layer 42, and the penetration toward the X1 direction from the end P2 of the positive composite layer 42 starts at substantially the same time, which may make the manufacturing time of the energy storage device 100 be shortest. That is, the distance W2 is preferably not less than $0.5(d^2/D^2)W1$ and not more than $2(d^2/D^2)W1$, more preferably not less than $0.7(d^2/D^2)W1$ and not more than $1.5(d^2/D^2)W1$, and still more preferably not less than $0.8(d^2/D^2)W1$ and not more than $1.2(d^2/D^2)W1$.

Third Embodiment

Figure 8:
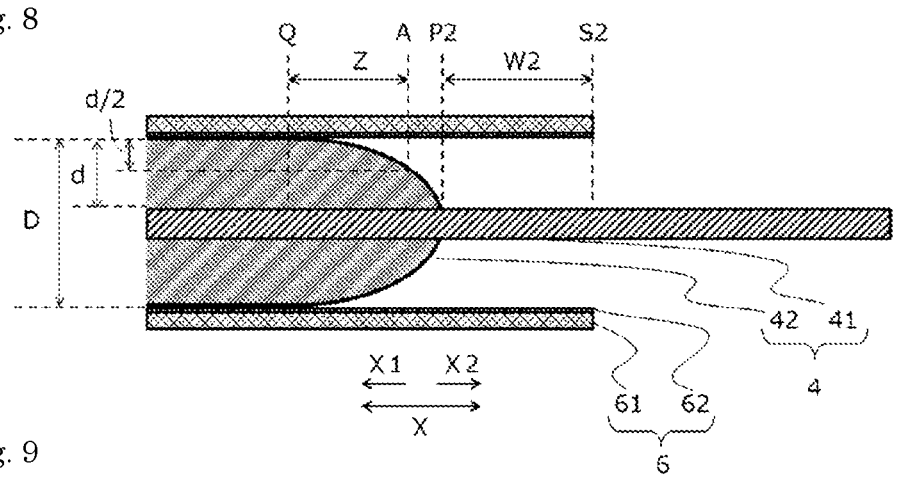
FIG. 8 is a diagram illustrating a mode near an end of a positive composite layer on a positive composite layer non-forming part side of an energy storage device according to a third embodiment.
Figure 9:
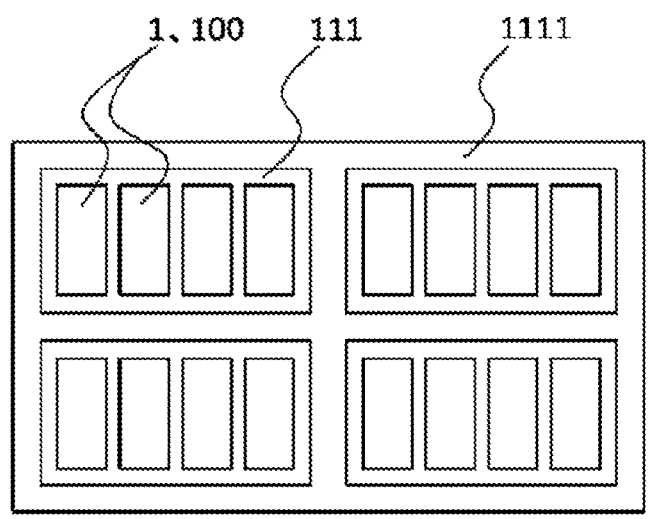
FIG. 9 is a diagram illustrating an energy storage apparatus equipped with a plurality of the energy storage devices according to the embodiments.

An energy storage device 100 according to a third embodiment will be described with reference to FIG. 8. In the third embodiment, the same reference numerals are used for the same components as those in the first embodiment or the second embodiment, and their description will be omitted.

The third embodiment of the invention has a tapering part in which the thickness of the positive composite layer 42 is reduced toward the X2 direction at the end P2 of the positive composite layer 42, in the first embodiment and the second embodiment. Herein, the tapering part is a part whose thickness transitions in a decreased manner in the X2 direction from a point of the positive composite layer 42, and the point shall be a tapering start point Q.

The tapering part generates a flow of the electrolyte along the tapering part, facilitating penetration of the electrolyte to the space between the insulating layer 62 and the positive composite layer 42. This enables the electrolyte to penetrate into the positive composite layer more efficiently, making it possible to reduce manufacturing time of the energy storage device.

The thickness change of the tapering part is preferably gentle. Specifically, given that the thickness of the composite layer 42 at the tapering start point Q is a reference, a distance Z between the tapering start point Q and a pint A at which the thickness of the positive composite layer is reduced by half (becomes d/2) in the X2 direction is preferably not less than 50 μm. The distance Z is more preferably not less than 100 μm, and still more preferably not less than 200 μm.

Making the distance Z be not less than 50 μm makes the space between the positive composite layer 42 of the tapering part and the insulating layer 62 become sufficiently larger than pores of the positive composite layer, and makes the volume of the space be moderately reduced toward the tapering start point Q, which may make it possible to preferentially introduce the electrolyte solution in the space. This makes it possible to preferably cause the electrolyte to penetrate into the positive composite layer more efficiently to shorten the manufacturing time of the energy storage device.

Note that the upper limit of the distance X may be in any range as long as it satisfies W1>W2 of the first embodiment or $0.5(d^2/D^2)W1 \leq W2 \leq 2(d^2/D^2)W1$ of the second embodiment.

In the third embodiment, a covering layer having an electric resistance higher than that of the positive composite layer 42 may be included in the X2 direction of the positive composite layer 42. Inclusion of the covering layer is preferable because the safeness of the energy storage device can be enhanced.

Note that, the covering layer is handled as being included in a part of the positive composite layer 42 in the third embodiment.

Other Embodiments

The technique disclosed in the description is not limited to the embodiments described above with reference to the drawings, and for example, the following various embodiments are also included therein.

In the above embodiments, examples are described in which the energy storage devices 1 and 100 are a lithium ion battery. However, this is not limited thereto, and the energy storage devices 1 and 100 may be another secondary battery such as a nickel hydrogen battery, or may be a primary battery. Alternatively, the energy storage devices 1 and 100 may be a capacitor or the like.

In the above-mentioned embodiments, the energy storage element 3 of the energy storage device 1 shall be the energy storage element 3 of a winding type formed into a flat shape by laminating and winding the positive electrode 4 and the negative electrode 5 with the separator 6 interposed therebetween, but this is not limited thereto. The energy storage element 3 may be a cylindrical energy storage element formed in a circular shape by laminating and winding them. The energy storage element 3 may be a laminated type energy storage element formed by laminating the positive electrode 4 and the negative electrode 5 with the separator 6 interposed therebetween. In the above-mentioned embodiments, the energy storage device 1 has one energy storage element 3, but this is not limited thereto and the energy storage device 1 may include a plurality of the energy storage elements 3.

Also, the invention can be provided as an energy storage apparatus including a plurality of the above-mentioned energy storage devices. An embodiment of the energy storage apparatus is illustrated in FIG. 8. In FIG. 8, an energy storage apparatus 1111 include a plurality of energy storage units 111. Each of the energy storage units 111 includes a plurality of the energy storage devices 1 or 100. The energy storage apparatus 1111 can be mounted as a power source for a vehicle such as an electric vehicle (EV), a hybrid electric vehicle (HEV), or a plug-in hybrid electric vehicle (PHEV).

INDUSTRIAL APPLICABILITY

The invention enables to shorten the manufacturing time of the energy storage device equipped with the separator including the insulating layer on its surface opposing the positive electrode. The invention can be effectively used for a power source for a vehicle, a power source for an electronic apparatus, a power source for power storage, or the like.

DESCRIPTION OF REFERENCE SIGNS 1, 100: energy storage device
13: inlet
111: energy storage unit
1111: energy storage apparatus 2: outer case
21: case body
22: lid
3: energy storage element
4: positive electrode
41: positive composite layer non-forming part
42: positive composite layer
5: negative electrode
51: negative composite layer non-forming part
52: negative composite layer
6: separator
61: substrate
62: insulating layer
7: positive electrode terminal
8: negative electrode terminal
9: positive electrode current collector
10: negative electrode current collector
11: clip for positive electrode
12: clip for negative electrode

The invention claimed is:

1. An energy storage device, comprising:
a negative electrode including a negative composite layer on a negative electrode collector foil and a negative composite layer non-forming part along a side of the negative electrode collector foil;
a positive electrode including a positive composite layer on a positive electrode collector foil and a positive composite layer non-forming part along a side of the positive electrode collector foil; and
a separator including an insulating layer on a surface of the separator, the separator being layered between the negative electrode and the positive electrode, the surface of the separator facing the positive electrode, and the insulating layer being layered between the positive electrode and the separator,
wherein the negative composite layer non-forming part and the positive composite layer non-forming part are disposed in opposite directions to each other,
wherein a part of the negative composite layer non-forming part is connected to a negative electrode current collector,
wherein a part of the positive composite layer non-forming part is connected to a positive electrode current collector,
wherein an end S1 on a side of the negative electrode current collector of the separator is projected more than an end P1 on the side of the negative electrode current collector of the positive composite layer,
wherein an end S2 on a side of the positive electrode current collector of the separator is projected more than an end P2 on the side of the positive electrode current collector of the positive composite layer,
wherein a distance W2 from the end P2 of the positive composite layer to the end S2 of the separator is smaller than a distance W1 from the end P1 of the positive composite layer to the end S1 of the separator,
wherein the separator includes a substrate comprising a polyolefin resin,
wherein the insulating layer, facing the positive electrode, is formed on a surface of the substrate,
wherein the insulating layer comprises inorganic particles, and
wherein, when viewed in a direction perpendicular to a stacking direction of the positive electrode on the separator and the negative electrode, the positive composite layer is uncovered by the insulating layer.

2. The energy storage device according to claim 1, wherein the positive electrode has a thickness of D,
wherein the positive composite layer has a thickness of d, and
wherein the distance W2 is not less than $0.5(d^2/D^2)W1$ and not more than $2(d^2/D^2)W1$.

3. The energy storage device according to claim 1, wherein the end P2 of the positive composite layer on the side of the positive electrode current collector includes a tapering part, and
wherein a distance from a tapering start point of the tapering part to a point at which the thickness of the positive composite layer is reduced by half is not less than 50 μm.

4. The energy storage device according to claim 1, wherein the insulating layer has a porosity of not less than 40%.

5. An energy storage apparatus equipped with the energy storage device according to claim 1.

6. The energy storage device according to claim 1, wherein the insulating layer faces away from the negative electrode.

7. The energy storage device according to claim 1, wherein the insulating layer is disposed between the surface of the substrate and the positive composite layer.

8. The energy storage device according to claim 1, wherein the insulating layer is located adjacent to the positive composite layer.

9. The energy storage device according to claim 1, wherein the polyolefin resin comprises at least one of polyethylene and polypropylene, and
wherein the inorganic particles include an oxide-based ceramic.

10. An energy storage device, comprising:
a negative electrode including a negative composite layer and a negative composite layer non-forming part;
a positive electrode including a positive composite layer and a positive composite layer non-forming part; and
a separator including a substrate and an insulating layer disposed on a surface of the substrate that faces the positive electrode, the insulating layer being directly exposed to a surface of the positive composite layer of the positive electrode, the separator being layered between the negative electrode and the positive electrode, and the insulating layer being layered between the positive electrode and the separator,
wherein the negative composite layer non-forming part is connected to a negative electrode current collector,
wherein the positive composite layer non-forming part is connected to a positive electrode current collector,
wherein, on a side of the negative electrode current collector, a first end of the separator is projected more than a first end of the positive composite layer,
wherein, on a side of the positive electrode current collector, a second end of the separator is projected more than a second end of the positive composite layer,
wherein a distance from the second end of the positive composite layer to the second end of the separator is less than a distance from the first end of the positive composite layer to the first end of the separator,
wherein the substrate of the separator includes a polyolefin resin,
wherein the insulating layer comprises inorganic particles, and
wherein, when viewed in a direction perpendicular to a stacking direction of the positive electrode on the separator and the negative electrode, the positive composite layer is uncovered by the insulating layer.

11. The energy storage device according to claim 10, wherein the insulating layer faces away from the negative electrode.

12. The energy storage device according to claim 10, wherein the insulating layer is disposed between the surface of the substrate and the positive composite layer.

13. The energy storage device according to claim 10, wherein the insulating layer is located adjacent to the positive composite layer.

14. The energy storage device according to claim 10, wherein the polyolefin resin comprises at least one of polyethylene and polypropylene, and
wherein the inorganic particles include an oxide-based ceramic.

15. The energy storage device according to claim 1, wherein a portion of the positive composite layer is not coated with the insulating layer.

16. The energy storage device according to claim 1, wherein the insulating layer is in contact with the positive electrode.

17. The energy storage device according to claim 1, wherein the substrate and the insulating layer are bonded together.

18. The energy storage device according to claim 1, wherein the substrate of the separator includes the surface facing the positive electrode and another surface facing the negative electrode, and
wherein the insulating layer is disposed on the surface of the substrate of the separator.

19. The energy storage device according to claim 1, wherein the substrate of the separator is a single layer that is disposed on a surface of the insulating layer and on a surface of the negative composite layer of the negative electrode.

* * * * *